(12) United States Patent
Canora et al.

(10) Patent No.: US 8,253,542 B2
(45) Date of Patent: Aug. 28, 2012

(54) METHOD AND SYSTEM FOR PERFORMING AFFINITY TRANSACTIONS

(75) Inventors: David Canora, Winter Garden, FL (US);
David Worrall, Clermont, FL (US);
Andy Schwalb, Mt. Dora, FL (US);
John Padgett, Clermont, FL (US); Eric Jacobson, Glendale, CA (US); Jim MacPhee, Clermont, FL (US); Kevin Rice, Altadena, CA (US); Dan Soto, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 847 days.

(21) Appl. No.: 12/231,729

(22) Filed: Sep. 4, 2008

(65) Prior Publication Data

US 2010/0052858 A1    Mar. 4, 2010

(51) Int. Cl.
*H04Q 5/22* (2006.01)
*G08B 13/14* (2006.01)
*G08B 23/00* (2006.01)
*G06F 17/00* (2006.01)
*G06K 5/00* (2006.01)

(52) U.S. Cl. ............ 340/10.41; 340/572.1; 340/573.1; 340/5.2; 340/10.1; 340/323 R; 235/375; 235/382

(58) Field of Classification Search ........... 340/572.1, 340/573.1, 5.2, 10.1, 10.41, 323 R; 235/375, 235/382
See application file for complete search history.

(56) References Cited

U.S. PATENT DOCUMENTS

| | | | |
|---|---|---|---|
| 5,287,269 A * | 2/1994 | Dorrough et al. ............ 705/17 |
| 5,537,102 A | 7/1996 | Pinnow | |
| 5,742,233 A | 4/1998 | Hoffman | |
| 6,346,886 B1 | 2/2002 | De La Huerga | |
| 6,634,949 B1 | 10/2003 | Briggs | |
| 6,682,074 B2 | 1/2004 | Weston | |
| 6,711,414 B1 | 3/2004 | Lightman | |
| 6,747,562 B2 | 6/2004 | Giraldin | |
| 6,757,719 B1 | 6/2004 | Lightman | |
| 6,761,637 B2 | 7/2004 | Weston | |
| 6,774,796 B2 | 8/2004 | Smith | |
| 6,778,066 B2 | 8/2004 | Smith | |
| 6,957,771 B2 | 10/2005 | Norris | |
| 6,967,566 B2 | 11/2005 | Weston | |

(Continued)

FOREIGN PATENT DOCUMENTS

WO    WO 2005069033    7/2005

*Primary Examiner* — Jennifer Mehmood
*Assistant Examiner* — Andrew Bee
(74) *Attorney, Agent, or Firm* — Farjami & Farjami LLP

(57) ABSTRACT

There is provided a physical token for use in a defined venue with a server having communication with the physical token. The physical token may comprise an identification data and a transmitter configured to transmit the identification data. The physical token is configured to transmit the identification data to the server to cause the server to initiate a sensory interaction with a user possessing the physical token. The sensory interaction may comprise a character in the defined venue interacting with the user possessing the physical token. The sensory interaction may also comprise a display screen in the defined venue displaying information to the user possessing the physical token. The sensory interaction may further comprise an audio speaker in the defined venue announcing information to the user possessing the physical token. The physical token may represent an affinity comprising an experience, entitlement, or characteristic of the user possessing the physical token.

35 Claims, 3 Drawing Sheets

U.S. PATENT DOCUMENTS

| | | |
|---|---|---|
| 7,029,400 B2 | 4/2006 | Briggs |
| 7,147,149 B2 | 12/2006 | Giraldin |
| 7,445,550 B2 | 11/2008 | Barney |
| 7,654,261 B1 | 2/2010 | Rockhold |
| 2002/0082859 A1* | 6/2002 | Lancos et al. ............ 705/1 |
| 2002/0116235 A1* | 8/2002 | Grimm et al. ............ 705/5 |
| 2003/0102956 A1* | 6/2003 | McManus et al. ......... 340/5.2 |
| 2003/0103414 A1 | 6/2003 | Lyon |
| 2003/0177370 A1 | 9/2003 | Smith |
| 2005/0110638 A1 | 5/2005 | Mohr |
| 2005/0272467 A1 | 12/2005 | Chiu |
| 2006/0288233 A1 | 12/2006 | Kozlay |
| 2007/0027576 A1* | 2/2007 | Juds et al. ............ 700/232 |
| 2007/0100677 A1* | 5/2007 | Boss et al. ............ 705/9 |
| 2008/0001764 A1 | 1/2008 | Douglas |
| 2008/0039206 A1* | 2/2008 | Ackley et al. ............ 463/40 |
| 2008/0114791 A1* | 5/2008 | Takatsu et al. ............ 707/100 |
| 2008/0235144 A1 | 9/2008 | Phillips |
| 2008/0244699 A1 | 10/2008 | Parhofer |
| 2008/0251575 A1* | 10/2008 | Bowling et al. ............ 235/375 |
| 2009/0258336 A1* | 10/2009 | Foote ............ 434/362 |

* cited by examiner

METHOD AND SYSTEM FOR PERFORMING AFFINITY TRANSACTIONS

BACKGROUND OF THE INVENTION

1. Field of the Invention

The present invention is generally in the field of communication. More particularly, the present invention relates to identification and association in communication systems.

2. Background Art

Defined venues rely upon a limited set of conventional means for tracking guest affinities and performing affinity transactions such as, for example, affinities for particular venue attractions, venue characters, or venue features. Such conventional means include, for example, a paper ticket and a plastic wristband. A paper ticket, for example, may be typically issued to a guest of a movie theater defined venue with the expectation that the guest will maintain possession of the paper ticket for the duration of a movie showing. Similarly, a plastic wristband, for example, may be typically issued to a guest of a music concert defined venue with the expectation that the guest will wear the plastic wristband while at the concert. Based on the guest's possession and display of the paper ticket or plastic wristband, the venue can infer particular affinities of the guest, and may perform appropriate affinity transactions. For example, the color or shape of the paper ticket or plastic wristband might indicate a particular guest affinity.

These various conventional means for tracking guest affinities have assorted drawbacks. For example, both paper tickets and plastic wristbands, if easily transferable, can pass from guest to guest for re-use, often against the policy of a defined venue. Additionally, a guest must maintain possession of a paper ticket or a plastic wristband and keep it readily displayed so that the venue can easily track the affinity represented. Furthermore, if in some circumstances a guest possesses a variety of paper tickets or wristbands at once it may be difficult or impossible for the venue to precisely reconcile the various represented affinities and to respond with an appropriate affinity transaction.

Accordingly, there is a need to overcome the drawbacks and deficiencies in the art by offering an improved method and system for tracking guest affinities and performing affinity transactions.

SUMMARY OF THE INVENTION

There are provided methods and systems for performing affinity transactions, substantially as shown in and/or described in connection with at least one of the figures, and as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to a method and system for performing affinity transactions. Although the invention is described with respect to specific embodiments, the principles of the invention, as defined by the claims appended herein, can obviously be applied beyond the specific embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
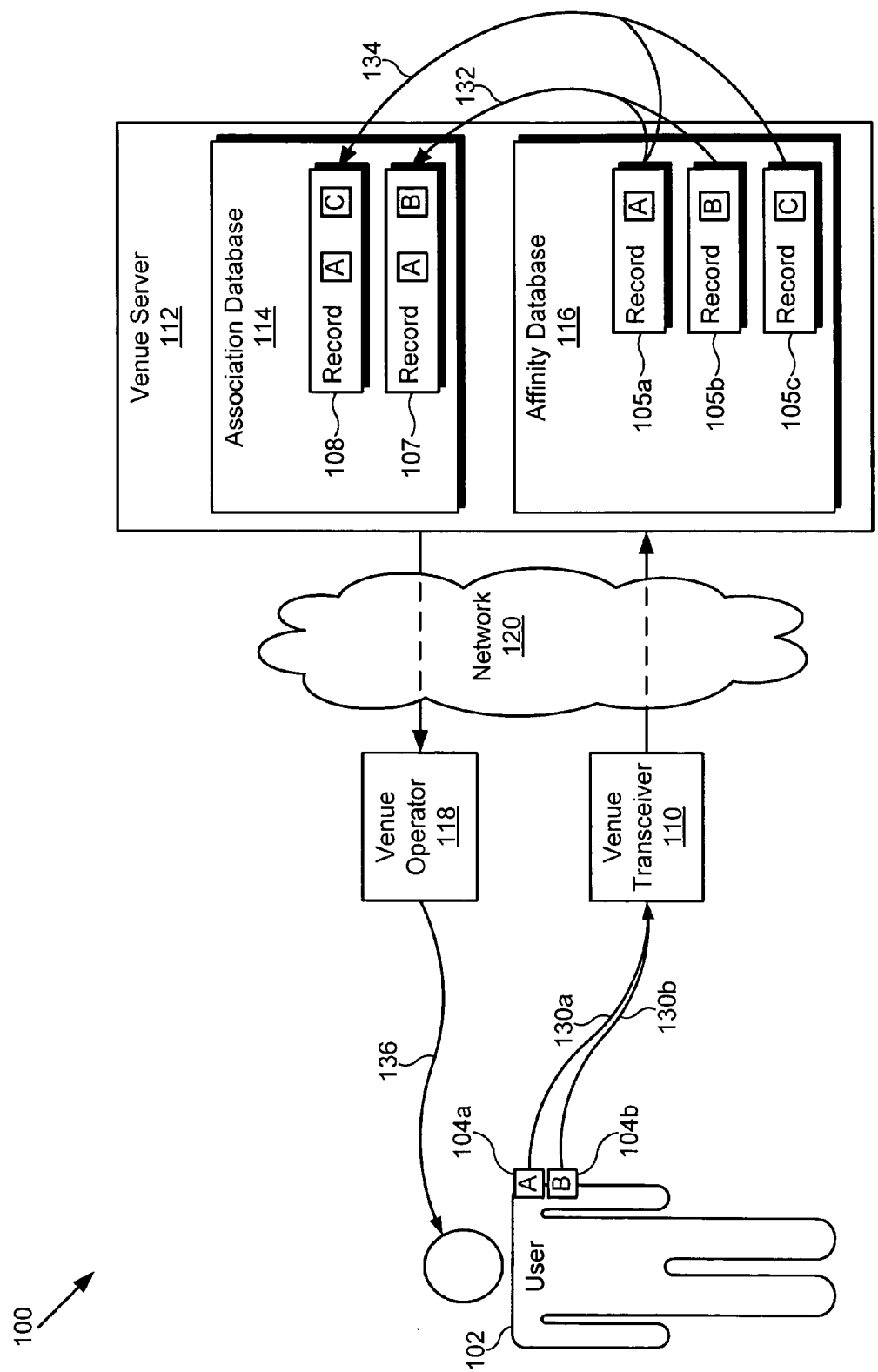
FIG. 1 shows a diagram of an exemplary system for performing affinity transactions, according to one embodiment of the present invention.

FIG. 1 shows exemplary system 100 according to one embodiment of the present invention. System 100 may be utilized, for example, to perform various affinity transactions in a defined venue, such as a theme park (e.g. Disneyland). System 100 comprises user 102, physical token 104a, and physical token 104b. Physical tokens 104a and 104b are, in one embodiment, worn on the person of user 102 or in possession of user 102, and are configured to engage in transmission 130a and transmission 130b during an affinity transaction by utilizing a transmitter. System 100 also comprises venue transceiver 110, venue server 112, and venue operator 118. Venue operator 118 is utilized by venue server 112 to complete an affinity transaction by performing sensory interaction 136. Network 120, in one embodiment a computer network as known in the art, is utilized for communication between venue transceiver 110, venue server 112, and venue operator 118 of system 100.

Physical token 104a, which in one embodiment represents an affinity of user 102, comprises a transmitter and an identification data according to the present invention. In one embodiment, the transmitter is implemented as an RFID device configured to store the identification data as a unique serial number, and also configured to transmit the unique serial number. Physical token 104a is configured to transmit the identification data to venue server 112 via network 120 and venue transceiver 110, which in one embodiment is implemented as an RFID transceiver. Physical token 104a may be associated with physical token 104b or with virtual token 105c, as described further below.

Figure 3:
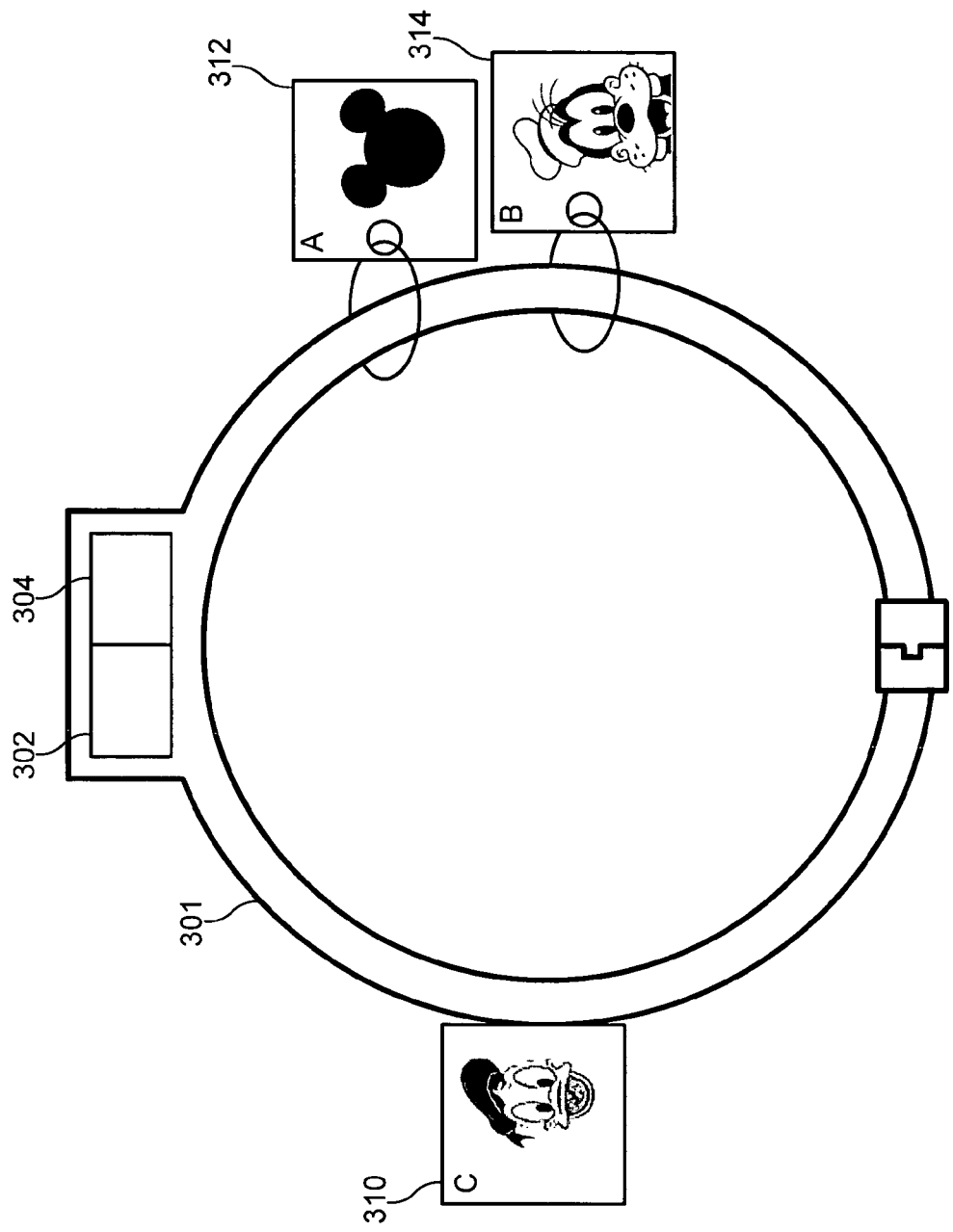
FIG. 3 shows a diagram of an exemplary identification band with secured association to the wearer including physical tokens for performing affinity transactions, according to one embodiment of the present invention.

Physical token 104a is designed in one embodiment as a pin to be pinned to the clothing of user 102, while in another embodiment physical token 104a may be designed as a necklace or another item of adornment that can be worn, while in yet another embodiment physical token 104a is a token or chip that can be carried by user 102. In one embodiment shown in FIG. 3, physical token 104a can correspond to physical token 312 or physical token 314, attached to wristband 301 with a loop or cord, or can correspond to physical token 310, attached to wristband 301 with an adhesive. In another embodiment, physical token 104a corresponds directly to wristband 301, comprising transmitter 302 coupled to memory 304 configured to store the identification data. In one embodiment, physical token 104a comprises (or is configured to be coupled to a device comprising) security and identification features as described in U.S. patent application Ser. No. 12/231,740, titled "Identification Band with Secured Association to the Wearer," and assigned to Disney Enterprises, Inc., which is hereby incorporated by reference in its entirety. Physical token 104b is configured in a manner similar to physical token 104a.

In one embodiment, physical token 104a represents an affinity stored as affinity record 105a in affinity database 116 of venue server 112. Affinity database 116 is, for example, a database stored on a hard drive and executing on a processor of venue server 112, as known in the art. Affinity database 116 comprises affinity record 105a and other affinity records. For example, affinity database 116 also comprises affinity record 105b, which in one embodiment is an affinity represented by physical token 104b, and comprises affinity record 105c, which in one embodiment is an affinity not represented by a physical token (i.e., is a virtual token). An affinity stored as an affinity record may be, for example, an experience had by user 102 (e.g., user 102 went on the Indiana Jones Adventure ride at Disneyland), an entitlement or purchase made by user 102 (e.g., user 102 bought a Mickey Mouse hat), an accomplishment or reward of user 102 (e.g., user 102 completed a Magic Kingdom video game), or a characteristic that user 102 identifies with (e.g., user 102 is a fan of the movie character Jack Sparrow).

System 100, in one embodiment, comprises a plurality of physical tokens and a plurality of virtual tokens, and user 102 can acquire physical tokens, such as physical tokens 104a and 104b, in a variety of ways at various first points of interest. For example, user 102 may receive physical token 104a from a ticket clerk when purchasing admission to Disneyland. As such, physical token 104a may represent, by affinity record 105a, that user 102 purchased admission to the theme park, for example, on a particular date. For another example, user 102 may enter the theme park and later receive physical token 104b from a mechanical dispenser inside Disneyland while waiting in line for the Mark Twain Riverboat ride. As such, physical token 104b, distributed to user 102 in line for the ride, may represent, by affinity record 105b, that user 102 went on the ride.

After acquiring one or more physical tokens, user 102 may utilize the physical token or tokens to perform affinity transactions at various second points of interest. User 102 may do so by utilizing physical tokens alone or in combination. For example, user 102 may use physical token 104a alone, or in combination with physical token 104b. As stated above, in one embodiment physical token 104a may represent, by affinity record 105a, that user 102 purchased admission to Disneyland on a particular date. Thus, user 102 may utilize physical token 104a alone to perform an affinity transaction to retrieve that information. In particular, user 102 may place physical token 104a in close proximity to venue transceiver 110, configured in this example as a short-range RFID reader, such that venue transceiver 110 reads the RFID device of physical token 104a, and sends the unique serial number of physical token 104a to venue server 112 via network 120. Venue server 112 may retrieve affinity record 105a in affinity database 116, retrieve the date (i.e., the affinity represented by physical token 104a) and transmit the date to venue operator 118, which in this example is configured as a display screen coupled to venue transceiver 110. User 102 may thus, during sensory interaction 136, read the date displayed on the display screen on which physical token 104a was purchased.

User 102 may utilize physical tokens in combination to perform affinity transactions with the assistance of association database 114 of venue server 112. Like affinity database 116, association database 114 is, for example, a database stored on a hard drive and executing on a processor of venue server 112, as known in the art. Association database 114 comprises, in one embodiment, association record 107, association record 108, and other association records not shown. Association record 107 represents an association of physical tokens 104a and 104b, and association record 108 represents an association of physical token 104a and virtual token 105c. An association, so represented, may indicate that a user, e.g. user 102, has more than one physical token in his possession, for example, or has associated a physical token with a virtual token.

As stated above, in one embodiment physical token 104a may represent, by affinity record 105a, that user 102 purchased admission Disneyland on a particular date. Additionally, physical token 104b may represent, by affinity record 105b, that user 102 went on the Mark Twain Riverboat ride in the theme park. Thus, user 102 may use physical token 104a in combination with physical token 104b to perform an affinity transaction to retrieve that information in combination. In particular, user 102 may put physical token 104a and physical token 104b in close proximity to venue transceiver 110, configured as a short-range RFID reader, such that venue transceiver 110 reads the RFID device of both physical tokens 104a and 104b, and sends the unique serial numbers to venue server 112 via network 120.

Venue server 112 is configured, in one embodiment, to recognize the simultaneity of transmissions 130a and 130b and thereby create association record 107 in step 132. Association record 107 associates physical tokens 104a and 104b in association database 114, and may be utilized to complete an affinity transaction initiated by user 102. For example, after step 132, venue server 112 may transmit the purchase date and ride information stored in affinity records 105a and 105b to venue operator 118, configured as a display screen coupled to venue transceiver 110. User 102 may thus read the date physical token 104a was purchased and the information about the Mark Twain Riverboat ride on venue operator 118 during sensory interaction 136. In another embodiment, venue operator 118 may be configured as a Mark Twain character who interacts with user 102 during sensory interaction 136. Notably, because the affinities of affinity records 105a and 105b are associated in association record 107, subsequent affinity transactions can invoke or utilize all such associated affinities by utilizing only physical token 104a or only physical token 104b.

For example, after association record 107 has been created in association database 114, user 102 may utilize a single physical token, e.g. physical token 104a, to perform an affinity transaction in the theme park that involves affinities of affinity records 105a and 105b. For example, in an embodiment where physical token 104a may be read by venue transceiver 110 implemented as a long-range RFID reader, but physical token 104b can only be read by a short-range RFID reader, an affinity transaction involving the affinities that both physical tokens 104a and 104b represent can be performed by reading only physical token 104a and then looking up association record 107. In particular, user 102 may put physical token 104a in sufficient proximity to venue transceiver 110, configured as a long-range RFID reader, such that venue transceiver 110 reads the RFID device of physical token 104a and sends the unique serial number of physical token 104a to venue server 112 via network 120. Venue server 112 may then retrieve association record 107 and affinity records 105a and 105b in affinity database 116, retrieve the date and ride information (i.e., the affinities represented by physical tokens 104a and 104b) and transmit the date and ride information to venue operator 118, which may complete the affinity transaction during sensory interaction 136 in a manner described above.

Thus, as discussed above, in various embodiments physical token 104a may be utilized alone to perform an affinity transaction, or may be utilized in combination with physical token 104b. In addition, physical token 104a may be utilized to perform an affinity transaction with virtual token 105c. For example, user 102 may utilize physical token 104a to perform an affinity transaction in the theme park while playing a Magic Kingdom video game, and virtual token 105c may represent a video game accomplishment. While user 102 is playing the video game, which in one embodiment comprises venue transceiver 110 implemented as an RFID transceiver, user 102 may stand close enough to the video game such that venue transceiver 110 reads the RFID device of physical token 104a and sends the unique serial number of physical token 104a to venue server 112 via network 120. Venue server 112 is configured, in one embodiment, to recognize the proximity of user 102 to the video game and thereby create association record 108 in step 134, thereby associating physical token 104a and virtual token 105c in association database 114.

After step 134, user 102 may utilize a single physical token, e.g. physical token 104a, to perform an affinity transaction in the theme park that involves affinities of affinity records 105a and 105c. For example, after being provided physical token 104a at a first point of interest (e.g. from a ticket clerk at the entrance of Disneyland), and after playing the Magic Kingdom video game, user 102 may leave the arcade where the video game is located and review the video game from a second point of interest, such as a Disney-themed cafe near the arcade. An instance of venue transceiver 110 implemented as a RFID reader may detect the presence of physical token 104a at the second point of interest, and user 102 may put physical token 104a in sufficient proximity to venue transceiver 110 such that venue transceiver 110 reads the RFID device of physical token 104a and sends the unique serial number of physical token 104a to venue server 112 via network 120. Venue server 112 thereby receives the identification data of physical token 104a and retrieves an affinity represented by physical token 104a (e.g. retrieves association record 108 and affinity records 105a and 105c). Venue server 112 may then initiate a sensory interaction with user 102 possessing physical token 104a by, for example, configuring venue operator 118 as an audio speaker that announces video game scores, thereby completing the affinity transaction during sensory interaction 136.

In one embodiment, user 102 may utilize physical token 104a to perform an affinity transaction outside the theme park after leaving the theme park. After being provided physical token 104a at a first point of interest (e.g. after being photographed at a picture station in Disneyland), user 102 may leave the theme park and review pictures taken at the picture station from, for example, a home computer (e.g., a second point of interest). In one embodiment, the home computer of user 102 includes venue transceiver 110 implemented as an RFID reader coupled to the home computer via, for example, a USB cable. In another embodiment, user 102 enters the unique serial number of physical token 104a into a keyboard or other input device of the home computer. The home computer, in one embodiment coupled to network 120 via the Internet, then sends the unique serial number of physical token 104a to venue server 112. Venue server 112 thereby receives the identification data of physical token 104a and retrieves an affinity represented by physical token 104a (e.g. retrieves an affinity record comprising the pictures taken at the picture station). Venue server 112 may then initiate a sensory interaction with user 102 by, for example, configuring the home computer of user 102 as venue operator 118 to display the pictures. For example, the home computer may display the pictures via a personalized web page or virtual scrapbook, thereby completing the affinity transaction during sensory interaction 136.

Figure 2:
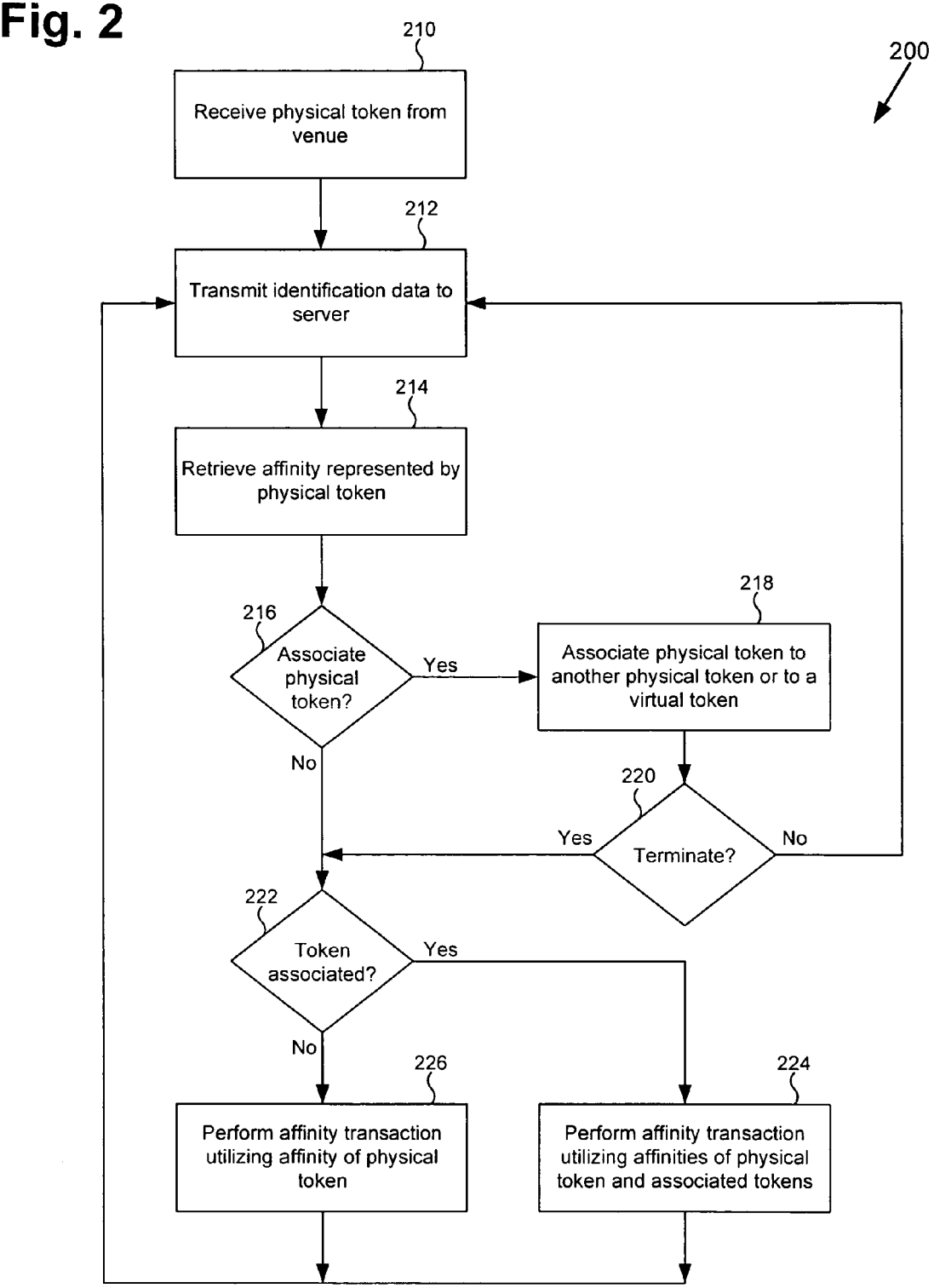
FIG. 2 shows a flowchart presenting an exemplary method for performing affinity transactions, according to one embodiment of the present invention.

FIG. 2 shows flowchart 200 of an exemplary method for performing affinity transactions, according to one embodiment of the present invention. Certain details and features have been left out of flowchart 200 that are apparent to a person of ordinary skill in the art. For example, a step may comprise one or more substeps or may involve specialized equipment or materials, as known in the art. While steps 210 through 226 indicated in flowchart 200 are sufficient to describe one embodiment of the present invention, other embodiments of the invention may utilize steps different from those shown in flowchart 200.

In step 210 of flowchart 200, a physical token, for example physical token 104a in FIG. 1, is received by a user, such as user 102. The physical token comprises a transmitter and an identification data, which may be implemented in one embodiment as an RFID device configured to transmit a unique serial number. The physical token may be utilized to perform various affinity transactions in a defined venue, such as Disneyland. The user may receive the physical token a variety of ways. For example, the user may receive the physical token from a ticket clerk when purchasing admission to the theme park, or later from a mechanical dispenser inside the theme park while waiting in line for a ride.

In step 212 of flowchart 200, the physical token transmits the identification data to a server in the venue. The server, which corresponds in one embodiment to venue server 112 in FIG. 1, receives the identification data via a venue transceiver corresponding to venue transceiver 110, and via a network corresponding to network 120. The server comprises, for example, an affinity database corresponding to affinity database 116 and an association database corresponding to association database 114. Both the affinity and the association database may be stored on a hard drive and may execute on a processor of the server, as known in the art.

In step 214 of flowchart 200, the server retrieves an affinity represented by the physical token. In particular, in one embodiment the server retrieves the affinity from the affinity database by, for example, searching the database for an affinity record matching the identification data transmitted from the physical token. The affinity may comprise, for example, an experience, an entitlement, an accomplishment, or a characteristic of the user of the physical token.

In step 216 of flowchart 200, the server determines whether to associate the physical token to a second physical token or to a virtual token. A second physical token corresponds, in one embodiment, to physical token 104b of FIG. 1, while a virtual token corresponds, in one embodiment, to affinity record 105c. The server may make such a determination based on several factors. For example, in one embodiment the server is configured to recognize the simultaneity of transmission of identification data from both physical tokens. In another embodiment, for example, the server is configured to recognize the proximity of the physical tokens to one another. The user may have received the second physical token from, for example, a mechanical dispenser inside Disneyland while waiting in line for a ride. As such, the second physical token may represent that the user went on the ride. The server may associate the physical tokens by, for example, creating an association record corresponding to association record 107 in the association database during step 218. In a second example, the server is configured to recognize that the user is playing a video game when the identification data is transmitted from the physical token. In such a circumstance the server may associate the physical token and a virtual token representing a video game accomplishment by, for example, creating an association record corresponding to association record 108 during step 218.

Some affinity transactions may terminate after performing step 218, if during step 220 the server determines that no further action needs to be taken. For example, flowchart 200 may terminate and return to step 212 if, for example, in step 218 a virtual token representing a video game accomplishment was associated to the physical token, and the user has stopped playing the video game. In another example, flowchart 200 may instead proceed to step 222 via step 220 if during step 218 a second physical token was associated to the physical token and the server determines that, for example, a sensory interaction corresponding to sensory interaction 136 should be performed via a venue operator corresponding to venue operator 118 in FIG. 1.

In step 222 of flowchart 200, the server determines whether a second physical token or virtual token is associated with the physical token. If a token is not so associated, then the server proceeds to perform an affinity transaction utilizing only the affinity represented by the physical token by, for example, performing an interaction with the venue operator in step 226. In contrast, if a token is so associated, then in step 224 the server may proceed to perform an affinity transaction utilizing the affinity represented by the physical token as well as the affinity represented by the associated physical or virtual token with the venue operator. After completing the affinity transaction in either step 226 or 224, flowchart 200 returns to step 212, whereby the user may initiate another affinity transaction.

In the manner described above, the invention as shown in exemplary system 100 and exemplary flowchart 200 achieves improved tracking of guest affinities and performing of affinity transactions while overcoming the drawbacks of conventional solutions. Physical and virtual tokens utilized by the invention may, for example, be received by a user, associated, and utilized in affinity transactions via systems or methods as described above. The drawbacks of conventional solutions, which are, for example, less precise, are avoided.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for use in a defined venue, the system comprising:
    a server having a database;
    a first physical token including:
        a first identification data;
        a first transmitter configured to transmit the first identification data to the server;
    a second physical token including:
        a second identification data;
        a second transmitter configured to transmit the second identification data to the server;
    wherein, the server is configured to:
        receive the first identification data from the first physical token possessed by a user;
        receive the second identification data from the second physical token possessed by the user;
        associate the first physical token and the second physical token in the database using the first identification data and the second identification data; and
        retrieve an affinity from the database, wherein the affinity is represented by an association of the first physical token and the second physical token in the database, and wherein the affinity includes an experience of the user.

2. The system of claim 1, wherein the server is configured to initiate a sensory interaction with the user possessing the first physical token and the second physical token, and wherein the sensory interaction comprises a movie character in the defined venue interacting with the user possessing the first physical token and the second physical token.

3. The system of claim 1, wherein the server is configured to initiate a sensory interaction with the user possessing the first physical token and the second physical token, and wherein the sensory interaction comprises a display screen in the defined venue displaying information to the user possessing the first physical token and the second physical token.

4. The system of claim 1, wherein the server is configured to initiate a sensory interaction with the user possessing the first physical token and the second physical token, and wherein the sensory interaction comprises an audio speaker in the defined venue announcing information to the user possessing the first physical token and the second physical token.

5. The system of claim 1, wherein the server is configured to initiate a sensory interaction with the user possessing the first physical token and the second physical token, and wherein the server is further configured to perform the sensory interaction utilizing a venue operator.

6. The system of claim 1, wherein the affinity further includes an entitlement, an accomplishment, or a characteristic of the user.

7. The system of claim 1, wherein the first transmitter comprises an RFID device.

8. The system of claim 1, wherein the first identification data comprises a unique serial number.

9. A method for use by a server for a defined venue, the method comprising:
    receiving a first identification data from a first physical token possessed by a user;
    receiving a second identification data from a second physical token possessed by the user;
    associating the first physical token and the second physical token in the database using the first identification data and the second identification data; and
    retrieving an affinity from the database, wherein the affinity is represented by an association of the first physical token and the second physical token in the database, and wherein the affinity includes an experience of the user.

10. The method of claim 9 further comprising initiating a sensory interaction with the user possessing the first physical token and the second physical token, wherein the sensory interaction comprises a movie character in the defined venue interacting with the user possessing the first physical token and the second physical token.

11. The method of claim 9 further comprising initiating a sensory interaction with the user possessing the first physical token and the second physical token, wherein the sensory interaction comprises a display screen in the defined venue displaying information to the user possessing the first physical token and the second physical token.

12. The method of claim 9 further comprising initiating a sensory interaction with the user possessing the first physical token and the second physical token, wherein the sensory interaction comprises an audio speaker in the defined venue announcing information to the user possessing the first physical token and the second physical token.

13. The method of claim 9 further comprising initiating a sensory interaction with the user possessing the first physical token and the second physical token, the sensory interaction utilizing a venue operator.

14. The method of claim 9, wherein the affinity further includes an entitlement, an accomplishment, or a characteristic of the user.

15. The method of claim 9, wherein the first physical token comprises an RFID device.

16. The method of claim 9, wherein the first identification data comprises a unique serial number.

17. The system of claim 1, wherein the second physical token is attachable to the first physical token.

18. The system of claim 1, wherein the first physical token is a wristband.

19. The method of claim 9, wherein the second physical token is attachable to the first physical token.

20. A server for use in a defined venue by a user possessing a first physical token including a first identification data and a first transmitter configured to transmit the first identification data to the server and a second physical token including a second identification data and a second transmitter configured to transmit the second identification data to the server, the server comprising:
    a database;
    the server being configured to:
        receive the first identification data from the first physical token possessed by a user;
        receive the second identification data from the second physical token possessed by the user;
        associate the first physical token and the second physical token in the database using the first identification data and the second identification data; and
        retrieve an affinity from the database, wherein the affinity is represented by an association of the first physical token and the second physical token in the database, and wherein the affinity includes an experience of the user.

21. The server of claim 20, wherein the server is configured to initiate a sensory interaction with the user possessing the first physical token and the second physical token, and wherein the sensory interaction comprises a movie character in the defined venue interacting with the user possessing the first physical token and the second physical token.

22. The server of claim 20, wherein the server is configured to initiate a sensory interaction with the user possessing the first physical token and the second physical token, and wherein the sensory interaction comprises a display screen in the defined venue displaying information to the user possessing the first physical token and the second physical token.

23. The server of claim 20, wherein the server is configured to initiate a sensory interaction with the user possessing the first physical token and the second physical token, and wherein the sensory interaction comprises an audio speaker in the defined venue announcing information to the user possessing the first physical token and the second physical token.

24. The server of claim 20, wherein the server is configured to initiate a sensory interaction with the user possessing the first physical token and the second physical token, and wherein the server is further configured to perform the sensory interaction utilizing a venue operator.

25. The server of claim 20, wherein the affinity further includes an entitlement, an accomplishment, or a characteristic of the user.

26. A server for use in a defined venue by a user possessing a first physical token including a first identification data and a first transmitter configured to transmit the first identification data to the server and a second physical token including a second identification data and a second transmitter configured to transmit the second identification data to the server, the server comprising:
    a database;
    the server being configured to:
        receive the first identification data from the first physical token possessed by a user;
        create a first record for a first affinity in the database in response to receiving the first identification data;
        receive the second identification data from the second physical token possessed by the user;
        create a second record for a second affinity in the database in response to receiving the second identification data, wherein the first record and the second record are associated in an association record in the database;
        invoke or use the first affinity, in response to the user utilizing the second physical token.

27. A method for use by a server for a defined venue, the method comprising:
    receiving the first identification data from the first physical token possessed by a user;
    creating a first record for a first affinity in the database in response to the receiving of the first identification data;
    receiving the second identification data from the second physical token possessed by the user;
    creating a second record for a second affinity in the database in response to the receiving of the second identification data, wherein the first record and the second record are associated in an association record in the database;
    invoking or using the first affinity, in response to the user utilizing the second physical token.

28. The server of claim 27, further comprising invoking or using the second affinity, in response to the user utilizing the second physical token.

29. The server of claim 27, further comprising invoking or using the second affinity, in response to the user utilizing the second physical token.

30. The method of claim 27, wherein the first affinity further includes an experience of the user.

31. The method of claim 27, wherein the first affinity further includes an entitlement, an accomplishment, or a characteristic of the user.

32. The method of claim 29 further comprising invoking or using the second affinity, in response to the user utilizing the first physical token.

33. The method of claim 29 further comprising invoking or using the second affinity, in response to the user utilizing the second physical token.

34. The method of claim 29, wherein the first affinity further includes an experience of the user.

35. The method of claim 29, wherein the first affinity further includes an entitlement, an accomplishment, or a characteristic of the user.

* * * * *

UNITED STATES PATENT AND TRADEMARK OFFICE
CERTIFICATE OF CORRECTION

PATENT NO.         : 8,253,542 B2                                         Page 1 of 1
APPLICATION NO.    : 12/231729
DATED              : August 28, 2012
INVENTOR(S)        : Canora et al.

It is certified that error appears in the above-identified patent and that said Letters Patent is hereby corrected as shown below:

In the Claims

Col. 10, line 42, "28. The server of claim 27" should read --28. The method of claim 27--.

Col. 10, line 45, "29. The server of claim 27" should read --29. The method of claim 27--.

Col. 10, lines 53-55, "32. The method of claim 29 further comprising invoking or using the second affinity, in response to the user utilizing the first physical token" should read --32. The server of claim 26, wherein the server is configured to invoke or use the second affinity, in response to the user utilizing the first physical token--.

Col. 10, lines 56-58, "33. The method of claim 29 further comprising invoking or using the second affinity, in response to the user utilizing the second physical token" should read --33. The server of claim 26, wherein the server is configured to invoke or use the second affinity, in response to the user utilizing the second physical token--.

Col. 10, line 59, "34. The method of claim 29" should read --34. The server of claim 26--.

Col. 10, line 61, "35. The method of claim 29" should read --35. The server of claim 26--.

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,253,542 B2 | Page 1 of 1 |
| APPLICATION NO. | : 12/231729 | |
| DATED | : August 28, 2012 | |
| INVENTOR(S) | : Canora et al. | |

It is certified that error appears in the above-identified patent and that said Letters Patent is hereby corrected as shown below:

In the claims,

Column 10, line 44, "second physical token" should be changed to --first physical token--.

Signed and Sealed this
Eleventh Day of November, 2014

Michelle K. Lee
*Deputy Director of the United States Patent and Trademark Office*